Aug. 16, 1938.                C. W. HERRIN                2,127,256
                          AUTOMATIC SEPARATOR
                          Filed Jan. 28, 1935            3 Sheets-Sheet 1
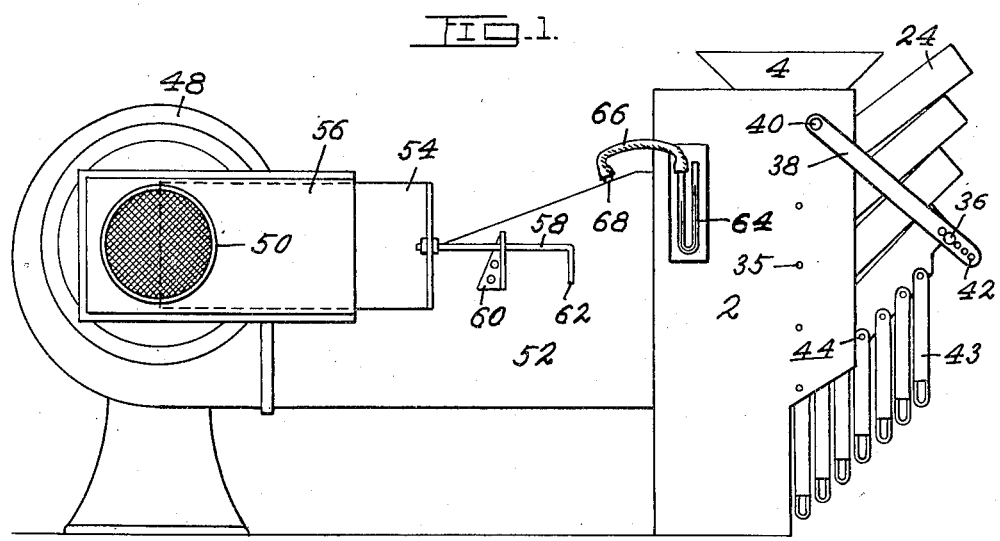
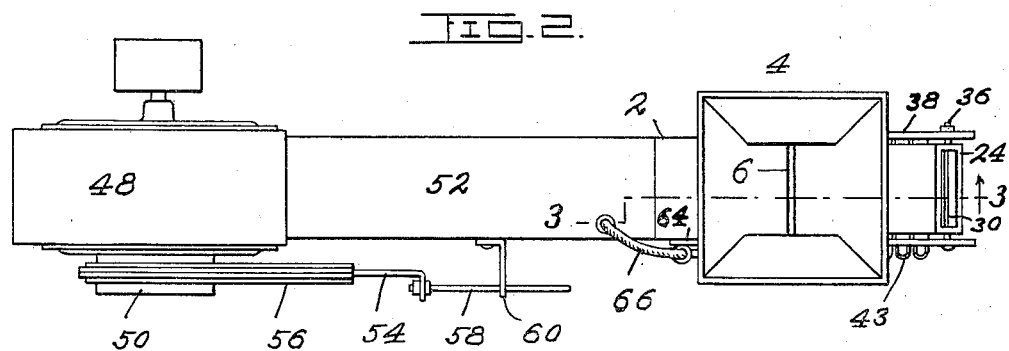
INVENTOR:
Charles W. Herrin,
BY
F. G. Fischer,
ATTORNEY

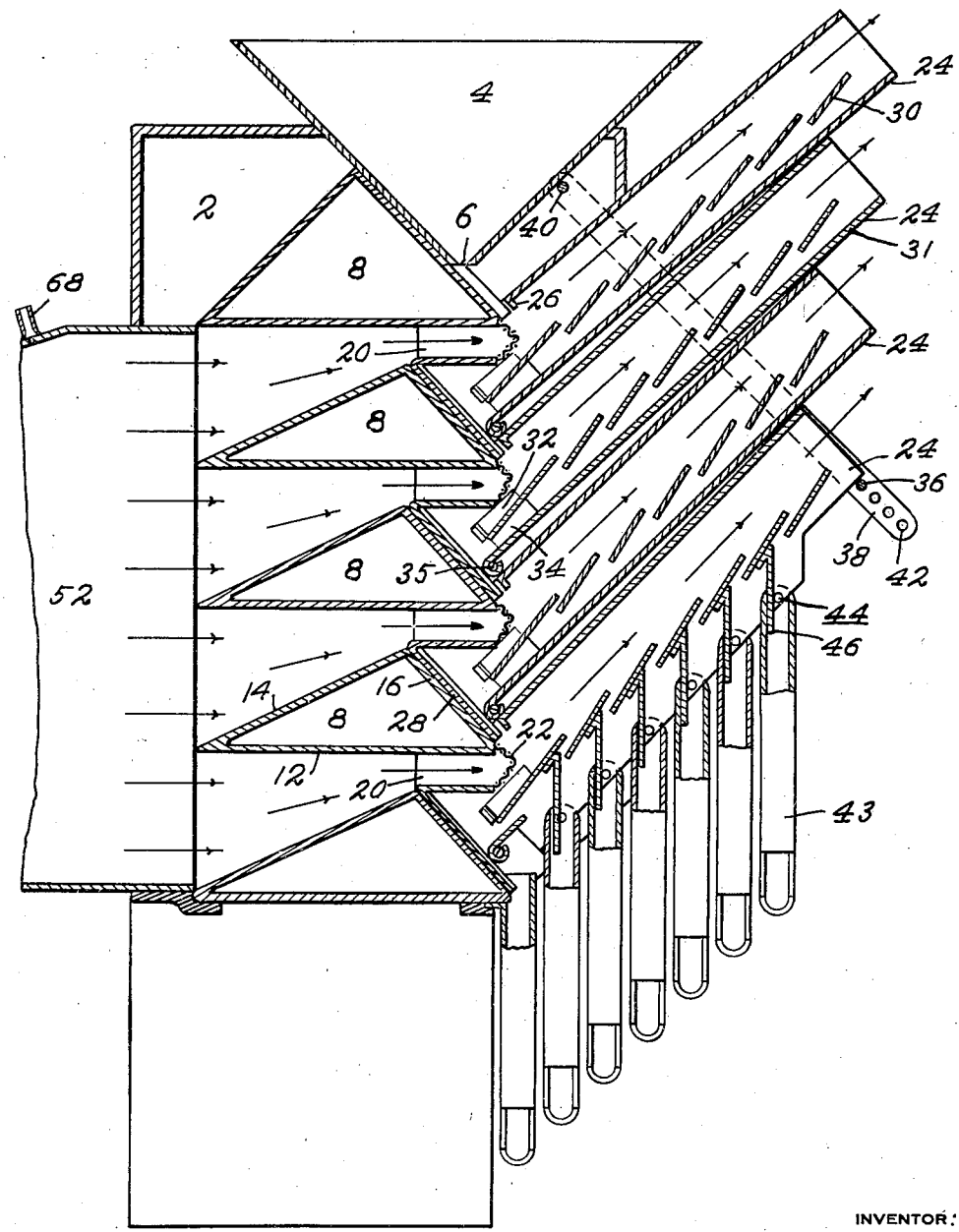

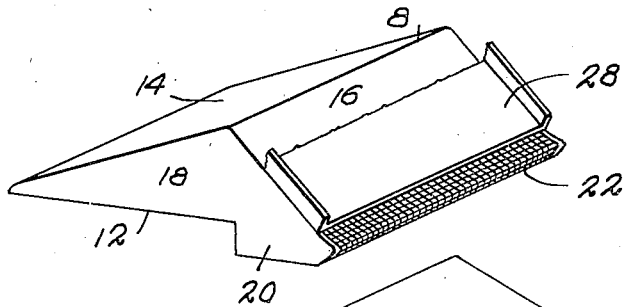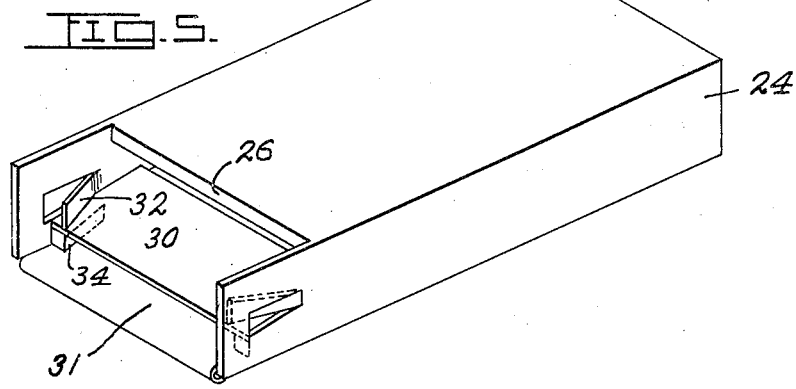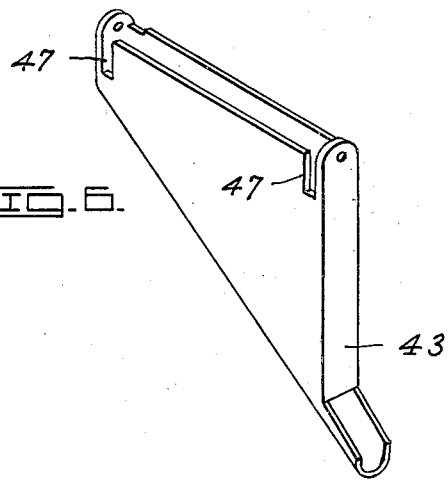

Patented Aug. 16, 1938

2,127,256

UNITED STATES PATENT OFFICE 2,127,256

AUTOMATIC SEPARATOR

Charles W. Herrin, Kansas City, Mo.

Application January 28, 1935, Serial No. 3,828

4 Claims. (Cl. 209—137)

My invention relates to apparatus in which the force of approximately gravity and an air blast are utilized in the separation of various materials from each other in accordance with their respective gravities.

In practice the different materials to be separated are preferably reduced to particles of uniform size by passing them through a screen of desired mesh. The particles are then allowed to fall by gravity across a blast of air so regulated as to permit the heaviest particles to fall through the bottom of the apparatus while the lightest particles are blown into the atmosphere through one or more segregating chambers. Each segregating chamber is inclined upwardly towards its discharge end and provided with a plurality of flights which cooperate with the air blast in separating the particles of intermediate weight which eventually gravitate to the lowermost segregating chamber where final separation of the particles in accordance with their respective weights is effected.

The apparatus is so arranged that it is unnecessary to stop operations for removal of the separated particles as the latter are discharged as fast as the unseparated materials are fed to the apparatus, thereby enabling the apparatus to separate large quantities of materials within a given period. The apparatus is designed to effect separations without the aid of acids, water, mercury, or the like, and therefore can be used to advantage in separating gold and other precious metals from sand, gravel, dirt, dust and other foreign matter in dry districts where water is not available.

In order that the invention may be fully understood, reference will now be had to the accompanying drawings, in which:

Fig. 1 is a side elevation of the apparatus.

Fig. 2 is a plan view of the apparatus.

Fig. 3 is an enlarged vertical section on line 3—3 of Fig. 2, showing a housing in which the materials are separated.

Fig. 4 is a detail perspective view of a partition.

Fig. 5 is a detail perspective view of a segregating chamber.

Fig. 6 is a detail perspective view of a discharge spout.

In carrying out the invention I employ a suitable housing 2 equipped at its upper portion with a hopper 4 into which the materials to be separated are fed. The hopper 4 is provided at its bottom portion with a narrow outlet 6 which extends almost the entire width of the housing 2 in order to discharge the materials in a thin stream so they can be effectively operated upon by air blasts hereinafter referred to.

The interior of the housing 2 is divided by a plurality of superimposed partitions 8, Fig. 3, each having a horizontal bottom 12, an upwardly inclined front wall 14 and a downwardly inclined rear wall 16. The partitions 8 are preferably the same width as the interior of the housing 2, to the sides of which the side walls 18 of the partitions are secured. The partitions 8 are connected by intervening nozzles 20 the discharge ends of which are covered with suitable screens 22 for a purpose hereinafter described.

Each screen 22 has an inclined upper portion which projects beneath an associate chute 28 to cooperate therewith in directing the materials upon the lowermost flights of a plurality of segregating chambers 24 into which the respective nozzles 20 discharge. The segregating chambers 24 are inclined upwardly towards their rear ends which preferably project from the rear of the housing 2, as shown. The segregating chambers 24 are preferably of shallow, rectangular formation to prevent the air blasts which pass therethrough from expanding unduly and thereby losing their effectiveness in separating the materials. The upper wall of each segregating chamber 24 is shorter than the other walls and reinforced at its forward end with a downturned flange 26 to prevent the materials blown against the inner surface of the upper wall from rebounding against an associated chute 28 one of which is fixed to each wall 16.

The segregating chambers 24 are each provided with a series of flights 30 which cooperate with the respective air blasts in separating the materials in accordance with their respective gravities. The flights 30 of each series are spaced from each other to permit some of the materials to fall through the intervening spaces to the bottom wall 31 of all but the lowermost segregating chamber which is open at its bottom as shown by Fig. 3. The flights 30 of each series are inclined rearwardly and upwardly and their rear ends overlap the underlying forward ends of the successive flights to prevent the air blasts from impinging against the bottom walls 31 and thereby preventing the materials from sliding down the latter to the adjacent chutes 28.

The side walls of each segregating chamber 24 are provided with deflectors 32 which overlap the respective lowermost flights 30 to prevent the materials sliding downwardly on the latter from passing between the adjacent side walls of the housing 2 and the partitions 8. The side walls of all but the lowermost segregating chamber 24 are also provided with deflectors 34 arranged between the lowermost flights 30 and the bottom walls 31 to prevent the materials sliding down upon the latter from passing between the housing 2 and the partitions 8.

The front ends of the segregating chambers 24 are pivotally supported upon rods 35 secured to the side walls of the housing 2. The rear ends of all but the lowermost segregating chamber 24 rest upon each other and the lowermost one is supported by a transverse rod 36 carried by a pair of metallic straps 38 suspended from a rod 40 extending transversely through the upper portion of the housing 2. In order that the segregating chambers 24 may be adjusted to the most advantageous inclinations for separating different kinds of materials the straps 38 are provided with a number of holes 42 for supporting the rod 36 at different elevations.

The lowermost segregating chamber 24, which, as hereinbefore stated, has no bottom wall, is provided with a suitable number of spouts 43 for carrying off the finally separated materials. The spouts 43 are suspended from the side walls of the lowermost segregating chamber by suitable means such as bolts or pivots 44. As the finally separated materials fall from the flights 30 in the lowermost segregating chamber 24 they are directed by guides 46, depending from said flights 30, into the respective spouts 43. The upper edge of one wall of each spout 43, has recesses 47 to receive the lower edges of the side walls of the lowermost segregating chamber 24.

Air under pressure is supplied to the nozzles 20 by suitable means such as a blower 48 having an inlet duct 50 and an outlet duct 52, which latter communicates with all of the nozzles 20. The volume of air entering the inlet duct 50 is controlled by means of a valve 54 slidably mounted in a casing 56 carried by said inlet duct 50. The valve 54 is adapted to be operated by a rod 58 extending through a guide 60 and terminating at its free end in a handle 62 located adjacent to a gage 64 which indicates the pressure of the air discharged from the outlet duct 52. The gage 64 communicates with the outlet duct 52 through a flexible tube 66 and a nipple 68, Figs. 1 and 3.

In practice the different materials to be separated are first reduced to particles of approximately uniform size by suitable means, not shown, and then fed into the hopper 4, through the narrow outlet 6 of which they fall by gravity upon the uppermost chute 28 which discharges the materials upon the uppermost screen 22 where it is subjected to the blast of air discharged from the associated nozzle 20. The force of the air blast is so regulated by the valve 54 as to permit the heaviest particles to pass downwardly through the housing 2 and escape through the initial spout 43, while some of the lightest particles are blown outwardly through the first or uppermost segregating chamber 24. The remaining particles are blown up the flights 30 distances in accordance with their respective weights, the lighter particles being carried beyond the heavier particles before they pass through the spaces between the flights 30 and fall upon the underlying bottom wall 31. The bottom wall 31 discharges the particles thereon upon the associated chute 28 which in turn discharges them in front of the second blast which blows more of the lightest particles up and out through the second segregating chamber, while the remaining particles are again separated according to weight by the air blast and the second series of flights 30. The foregoing operations are repeated until the final separations take place in the lowermost segregating chamber 24 from which the separated particles are discharged through the respective spouts 42.

During the foregoing operations the particles discharged from the respective chutes 28 and the segregating chambers 24 are prevented by the screens 22 from entering and possibly clogging the nozzles 20. The gage 64 enables the operator to readily ascertain what air pressures are most efficient for acting on different kinds of materials, so that the valve 54 can be set accordingly.

While I have shown four nozzles 20 and four segregating chambers 24, it is to be understood that this number may be reduced or enlarged in accordance with the volume of materials to be separated. For instance, if the volume is small the lowermost segregating chamber 24 and the lowermost nozzle may suffice to effect the separations, whereas if a large volume is to be separated the number of nozzles and segregating chambers are increased accordingly. I also reserve the right to make such other changes and modifications as properly fall within the spirit and scope of the invention as claimed.

Having thus described my invention, what I claim and desire to secure by Letters Patent, is:

1. In an apparatus of the character described, a housing, means for delivering materials of different gravities into the upper portion of said housing, superimposed partitions arranged in the housing and spaced apart to leave intervening air passages, superimposed segregating chambers inclined upwardly towards their rear ends and pivotally mounted at their lower forward ends in the housing and adjacent to said partitions, space being left between the partitions and said segregating chambers for passage of the heavier materials, means for forcing currents of air through the air passages, across the passage for the materials, and through the segregating chambers to separate the materials in accordance with their respective gravities, a series of flights extending across the interior of each segregating chamber above the bottom wall thereof to cooperate with the respective air currents in separating the materials, chutes on the partitions for directing the materials upon the respective lowermost flights, and deflectors in the lower portions of the segregating chambers extending inwardly from the side walls thereof for directing the materials upon said chutes.

2. In an apparatus of the character described, a segregating chamber comprising top, bottom, and side walls, a series of inclined overlapping flights spaced apart from each other and above the bottom wall and extending across the interior of the segregating chamber, deflectors extending inwardly from the side walls over the foremost flight, and other deflectors extending inwardly from the side walls over the bottom wall.

3. In an apparatus of the character described, a housing, an inclined segregating chamber open at each end and supported by said housing, a chute adapted to discharge materials into the lower end of said segregating chamber, a nozzle arranged beneath said chute and adapted to discharge a blast of air into the lower end of the segregating chamber to separate the materials, and a screen arranged over the discharge end of the nozzle to prevent the entrance of materials from the chute or the inclined segregating chamber and having an inclined upper portion in line with the chute to coact therewith in discharging the materials into the segregating chamber.

4. In an apparatus of the character described, a housing open at its rear portion, a plurality of superimposed inclined segregating chambers adjustably mounted at their lower front ends in said housing and projecting from the opening in the rear portion of the latter, a pair of metallic straps pivotally mounted at their upper ends in the housing and extending outwardly through the rear opening thereof to assist in supporting the outer ends of said segregating chambers, each of said straps having a series of holes in its outwardly extending portion, a rod adapted to enter any of the holes in said straps and coact with the latter in supporting the segregating chambers at different inclinations, means for feeding materials into the lower ends of the segregating chambers, and means for discharging blasts of air through the segregating chambers to coact therewith in separating the materials.

CHARLES W. HERRIN.